United States Patent [19]
Ikeda

[11] Patent Number: 5,817,348
[45] Date of Patent: Oct. 6, 1998

[54] AIR WORKING SYSTEM FOR VARIOUS DRIVE UNITS OF STRETCH-BLOW MOLDING MACHINE

[75] Inventor: Minoru Ikeda, Sakakimachi, Japan

[73] Assignee: A.K. Technical Laboratory, Inc., Nagano-ken, Japan

[21] Appl. No.: 685,186

[22] Filed: Jul. 18, 1996

[30] Foreign Application Priority Data

Jul. 18, 1995 [JP] Japan ..................... 7-202689

[51] Int. Cl.⁶ .......................... B29C 49/12; B29C 49/56; B29C 49/62
[52] U.S. Cl. .......................... 425/529; 425/535; 425/540
[58] Field of Search .................... 425/529, 535, 425/540, 522

[56] References Cited

U.S. PATENT DOCUMENTS

| | | | |
|---|---|---|---|
| 2,345,082 | 3/1944 | Waseige | 137/121 |
| 3,239,879 | 3/1966 | Resnick | 425/535 |
| 3,400,636 | 9/1968 | Schneider | 91/452 |
| 4,372,735 | 2/1983 | Collette | 425/529 |
| 4,488,863 | 12/1984 | Collette | 425/530 |
| 4,648,824 | 3/1987 | Aoki | 425/529 |
| 4,790,741 | 12/1988 | Takakusaki et al. | 425/529 |
| 5,585,066 | 12/1996 | Weiss | 425/529 |
| 5,648,026 | 7/1997 | Weiss | 264/526 |

FOREIGN PATENT DOCUMENTS

| | | |
|---|---|---|
| 0655313 | 5/1995 | European Pat. Off. . |
| 0655314 | 5/1995 | European Pat. Off. . |
| 3111925 | 10/1982 | Germany . |

*Primary Examiner*—Robert Davis
*Attorney, Agent, or Firm*—Ostrolenk, Faber, Gerb & Soffen, LLP

[57] ABSTRACT

In order to stretch an injection-molded preform by a stretching rod in the axis direction and to blow mold it into a hollow product such as a vessel with a predetermined shape in a blow mold, some of the blow air after used is collected in a low-pressure working-air tank set separately from a high-pressure blow-air tank and operating selector valves in a circuit and the collected air is used for some of the working air for an air cylinder for operating units related to stretch-blow molding by air cylinders. To decrease the availability factor of a compressor by collecting used blow air and thereby, make it possible to cut the cost required for compressed air and decrease exhaust noises.

4 Claims, 2 Drawing Sheets

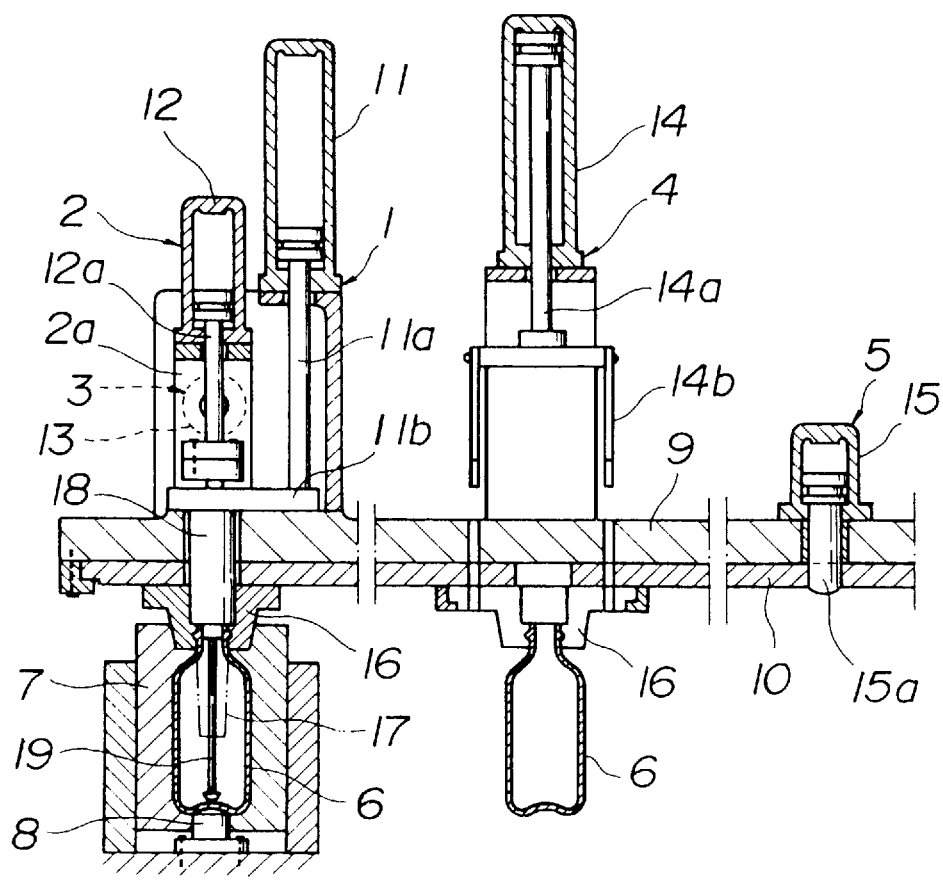

AIR WORKING SYSTEM FOR VARIOUS DRIVE UNITS OF STRETCH-BLOW MOLDING MACHINE

BACKGROUND OF THE INVENTION

1. Field of the Invention

The present invention relates to an air working method and an air working system for various drive units of a stretch-blow molding machine for molding an injection-molded preform into a hollow product such as a thin-wall vessel immediately after releasing the preform or after reheating the released preform.

2. Background Art

In general, an air cylinder unit is used to stretch-blow mold an injection-molded preform into a vessel or the like as various drive units.

FIG. 2 is a schematic view of a molding machine for stretch-blow molding an injection-molded preform into a thin-wall vessel, in which various drive units related to molding such as a vertically-moving unit 1 for a blow core, an extending unit 2 for a stretching rod, a fixing unit 3 for a blow core, a releasing unit 4 for a product, and a positioning unit 5 for a transfer board are operated by air cylinder units 11, 12, 13, 14, and 15. Though not illustrated, a bottom mold 8 of a blow mold 7 is also ertically moved by an air cylinder depending on the bottom structure of a product 6.

In the case of the above stretch-blow molding machine, when a preform 17 held by a neck mold 16 at the under surface of a transfer board 10 rotatably set to the under surface of a support board 9 reaches the opened blow mold 7 by intermittent rotation of the transfer board 10, working air of approx. 10 kgf/cm$^2$ is supplied to the upper chamber of the air cylinder unit 15 of the positioning unit 5, thereby a pin 15a is protruded downward and set into a positioning hole of the transfer board 10, and the blow mold 7 and the neck mold 16 are positioned.

When the positioning operation is completed, the transfer board 10 is lowered together with the support board 9 by operations of a hydraulic power unit to lower the preform 17 to the center of the blow mold 7. Then, the blow mold 7 is closed by hydraulic pressure to close with the neck mold 16. Thereby, the preform 17 is located at the center of the closed blow mold 7.

When the mold closing operation is completed, the working air is supplied to the upper chamber of the air cylinder unit 11 of the vertically-moving unit 1 for a blow core and then a piston rod 11a is moved downward to lower a blow core 18 set to the under surface of a bed plate 11b at the front end of the piston rod 11a and the extending unit 2 for a stretching rod set to the upper surface of the bed plate 11b. Thereby, the blow core 18 inserted a stretching rod 19 is inserted into the neck mold 16 and the position thereof is fixed by a piston rod (not illustrated) of the air cylinder unit 13 of the fixing unit 3 for a blow core to be next operated by air. This fixing operation is performed by fitting the foremost end of the piston rod to the lateral of a frame 2a of the extending unit 2 for a stretching rod.

When the position of the blow core 18 is fixed, the working air is supplied to the upper chamber of the air cylinder unit 12 of the extending unit 2 for a stretching rod, the stretching rod 19 connected to the front end of the piston rod 12a lowers by passing through the blow core 18 together with the rod 12a and the preform 17 is stretched in the axis direction by the stretching rod 19. High-pressure air of 20 to 30 kgf/cm$^2$ is supplied into the preform from the blow core 18 simultaneously with or slightly later than the above stretching operation and the preform 17 is fully expanded in a cavity and molded into the product 6 shown in FIG. 2.

When the molding operation is completed, the whole high-pressure air used for blow molding is exhausted to the atmosphere, and moreover, the blow mold 17 is opened and the support board 9 and the transfer board 10 are moved upward. Furthermore, the working air is supplied to the lower chambers of the air cylinder units 11 and 12, the product 6 is released from the blow mold 7 by upward movement of the piston rods 11a and 12a, and the blow core 18 escapes out of the neck mold 16 and rises up to its original position.

When the neck mold 16 is moved up to the position of the product releasing unit 4 by rotation of the transfer board 10 after positioning is canceled and stops there, positioning operation is performed again in the same manner as the above, the working air is supplied to the upper chamber of the air cylinder unit 14, and the piston rod 14a moves downward. An expanding member 14b is present at the front end of the piston rod 14a and the front end portion is inserted into the neck mold 16 to forcibly open the neck mold 16 comprising a pair of split molds and release the product 6. Simultaneously with the releasing operation, a newly transferred preform is stretch-blow molded at the position of the blow mold 7. After releasing the product 6, the air cylinder unit 14 moves the piston rod 14a upward by the working air supplied to its lower chamber to return the expanding member 14b to its original position and make it possible for the transfer board 10 to rotatively move.

Therefore, in the case of the present invention, the above various drive units are defined as various drive units related to stretch-blow molding. Moreover, to separate the pressure of blow air from that of working air, the blow air is defined to as high-pressure air and the working air is defined as low-pressure air.

When an air cylinder unit is used for the various drive units related to stretch-blow molding, high-pressure air compressed by a compressor is stored in a tank and the air is used as blow air at a high pressure and working air at a low pressure separately. Therefore, because the compressed air stored in the tank is greatly consumed in one molding cycle, there is a problem that the compressor must frequently be operated. Moreover, there is a problem of noises because the high-pressure air used for blow-molding is entirely exhausted.

Recycling some of high-pressure blow air as low-pressure air is already disclosed in the official gazette of Japanese Patent Laid-Open No. 7-195501 (or EP 0 655 313 A1) and recycling high-pressure working air as low-pressure working air is already disclosed in the official gazette of Japanese Patent Laid-Open No. 7-251443 (or EP 0 655 314 A1). In the case of the former, the high-pressure air used for expanding a preform is supplied to a low-pressure air supply source and the low-pressure air from the low-pressure air supply source is used for supplementary adjusting air-pressure for stretch-blow molding a preform or for preliminary molding a preform before supplying high-pressure blow air. In this case, air-pressure-type drive units related to stretch-blow molding are operated by the working air supplied from a separate working-air supply source.

In the case of the latter, an auxiliary working-air supply source with a low pressure level is used in addition to a main working-air supply source of air-pressure operated elements related to stretch-blow molding, the air from the main working-air supply source is used to operate the air-pressure operated elements and thereafter exhausted to the auxiliary working-air supply source to perform second air operations such as return of a stretching rod by using low-pressure-level working air supplied from the auxiliary working-air supply source.

Also in the cases of these prior arts, the high-pressure air used for one operation is recycled as low-pressure air for another operation. Therefore, the high-pressure air used for blow molding is used as low-pressure air for blow molding and the high-pressure air used for drive units is used as low-pressure air for drive units. However, the high-pressure air used for blow molding is not recycled yet as an air drive source for various drive units using a pressure lower than the pressure of blow air.

Even if the used blow air exhausted to the atmosphere after blow molding has a high pressure, it is limited in quantity to collect the used blow air in a separately prepared working-air tank by using a pressure difference.

Moreover, it is impossible to compensate for the whole working-air consumption by collected air but only partial replenishment is performed in general. Therefore, when air consumption is repeated, working air is reduced because of the difference between air consumption and collected air quantity. Unless the reduction is supplemented by any means, it is very difficult to recycle used blow air as working air of various drive units.

SUMMARY OF THE INVENTION

The present invention solves the conventional problems such as frequent operation of a compressor, the cost required for compressed air, and exhaust noises, the invention acting by recovering used blow air which is to be entirely exhausted after blow molding a preform and using the recovered air as working air.

Therefore, it is an object of the present invention to solve the problem of used blow air when collecting the high-pressure air used for blow-molding of a preform in a low-pressure working-air tank separate from a high-pressure blow-air tank as working air for various drive units related to stretch-blow molding by using a compressor for supplying compressed air to the blow-air tank so that collected blow air can be recycled as working air and provide a method and a system capable of decreasing the availability factor of the compressor even if the compressor is used for the both tanks and thereby, cutting the cost required for compressed air and decreasing exhaust noises.

To pneumatically operate various drive units for molding an injection-molded preform into a hollow product such as a vessel with a predetermined shape by stretching the preform by a stretching rod and expanding it by blowing high-pressure air in a blow mold, in the air working method of the present invention to achieve the above object, a high-pressure blow-air tank for expanding the preform, a low-pressure working-air tank for operating various drive units related to the above stretch-blow molding, and a compressor for supplying compressed air to the both tanks are employed, the used blow air after supplied from the blow-air tank into the blow mold to expand the preform into a predetermined shape is collected until the working-air tank in which air is stored to be consumed to operate the various drive units is saturated with the collected blow air, compensation for the reduction of working air due to the difference between air consumption and collected air quantity is achieved by supplying compressed air to the working-air tank from the compressor so as to effectively recycle some of the used blow air as working air.

The above various drive units related to stretch-blow molding include a vertically-moving unit for a blow core, a extending unit for a stretching rod, a fixing unit for a blow core, a positioning unit for a transfer board, and a releasing unit for a product, each of which is reciprocated by a piston of an air cylinder and in which the piston of each drive unit is reciprocated by the used blow air collected in a working-air tank.

The air working system of the present invention for various drive units comprises a blowing unit constituted by connecting a blow core for injecting high-pressure air into a preform in a blow mold to expand the preform with a blow-air tank for always storing a predetermined amount of high-pressure air by a blow-air circuit provided with a selector valve and connecting an exhaust circuit provided with a selector valve to the blow core side of the blow-air circuit, a working unit constituted by connecting air cylinder units of various drive units related to stretch-blow molding of a preform with a low-pressure working-air tank by a working-air circuit provided with a pressure reducing valve and a selector valve, an air collecting circuit provided with a selector valve connected to both the working-air tank and the blow-air circuit to collect used blow air from the blow-air circuit to the working-air tank as working air, and a compressor connected to both the blow-air tank and the working-air tank to supply compressed air to the blow-air tank while supplying compressed low-pressure air to the working-air tank by a pressure reducing valve set in the circuit.

Moreover, each of the various drive units connected to the low-pressure working-air tank by the working-air circuit is provided with an air cylinder unit to be reciprocated by working air with a pressure lower than blow air and has a selector valve for each air cylinder unit.

The method and the system of the present invention can be applied to any one of the molding method and system generally referred to as the one-stage or hot parison method for continuously injection-molding a preform and stretch-blow molding the preform into a hollow product such as a vessel and the molding method and system generally referred to as the two-stage or cold parison method for temporarily stocking an injection-molded preform and thereafter reheating the preform to stretch-blow mold the preform into a product such as a vessel.

According to the present invention of recycling high-pressure air exhausted after the above blow-molding of a preform by collecting the air in a working tank by a differential pressure and compensating for the insufficient pressure of collected air by raising the pressure by a compressor, it is possible to prevent air pressure from lowering at the time of peak air consumption, cut the cost of compressed air because the availability factor of the compressor decreases, lengthen the maintenance cycle because the clearance rate increases, and solve the problem of exhaust noises because the number of failures decreases and the amount of air to be exhausted into the atmosphere decreases.

Moreover, the air working system of the present invention is not complicated in structure compared to a conventional system or does not require special means to operate the system because a working-air tank is connected to both a compressor and a blow-air circuit separately from a blow-air tank and only a pressure reducing valve and a selector valve are set to the compressor and the circuit.

BRIEF DESCRIPTION OF THE DRAWINGS

FIG. 2 is a schematic sectional view of the stretch-blow molding machine provided with various drive units to be operated by the present invention.

DETAILED DESCRIPTION OF THE PREFERRED EMBODIMENTS

Figure 1:
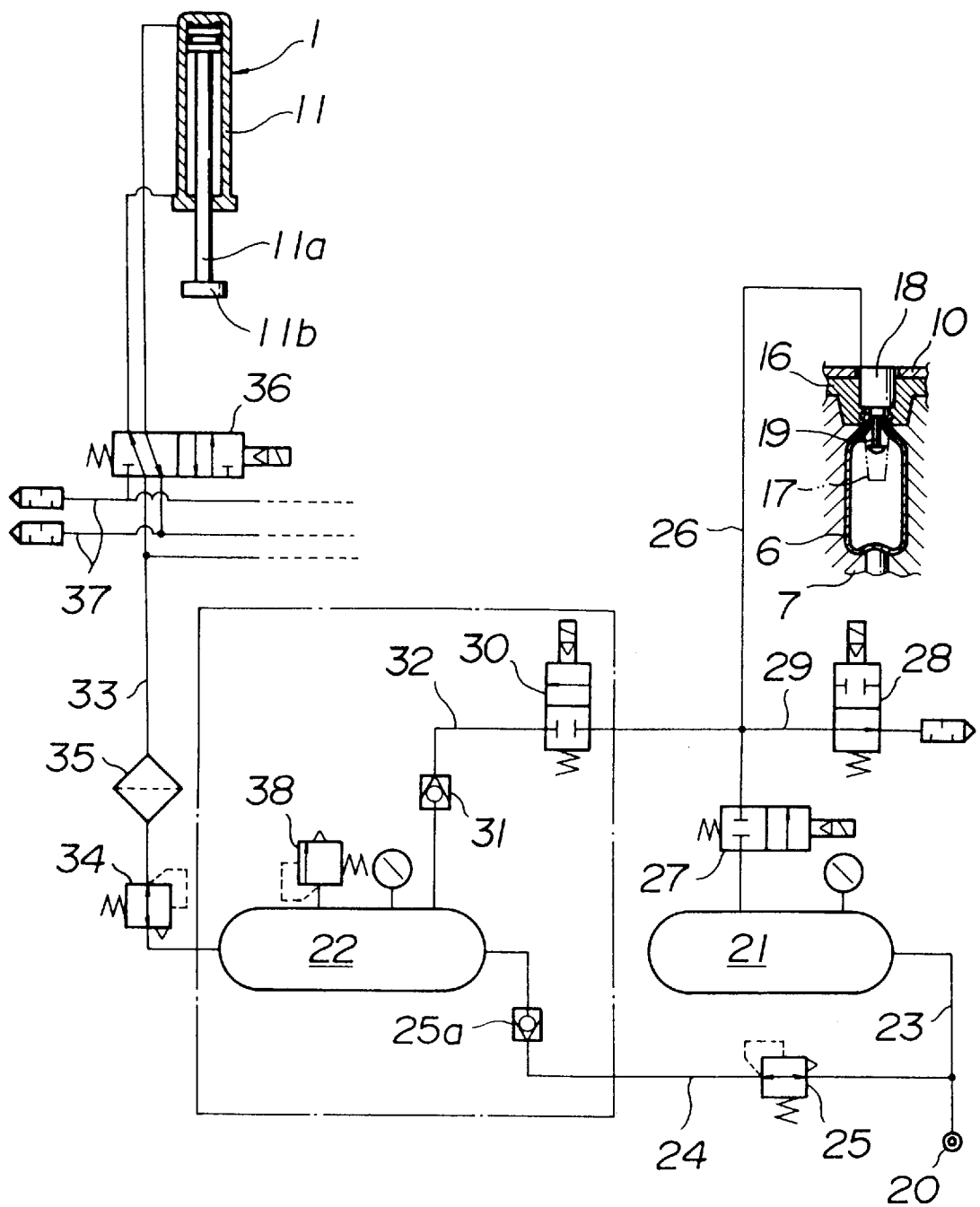
FIG. 1 is an illustration of an embodiment of the air working system of the stretch-blow molding machine of the present invention.

In FIG. 1, numeral 20 represents a compressor with which a blow-air tank 21 for storing high-pressure air (20 to 30 kgf/cm$^2$) and a working-air tank 22 for storing low-pressure air (11 to 15 kgf/cm$^2$) are connected via air compression and supply circuits 23 and 24. Moreover, the air compression and supply circuit 24 is provided with a pressure reducing valve 25 to supply low pressure air to the working-air tank 22 and a check valve 25a.

A blow-air circuit 26 provided with a selector valve 27 is set between the blow-air tank 21 and the blow core 18 of the blow mold 7 and an exhaust circuit 29 provided with a selector valve 28 is connected to the blow core side of the blow-air circuit 26.

The working-air tank 22 is connected with the blow-air circuit 26 by an air collecting circuit 32 provided with a selector valve 30 and a check valve 31 and moreover connected with the air cylinder unit 11 of the vertically-moving unit 1 for a blow core set to the stretch-blow molding machine and other drive units related to molding shown in FIG. 2 by a working-air circuit 33.

The working-air circuit 33 is provided with a pressure reducing valve 34, a filter 35, and a selector valve 36 in order and therefore, the working air in the working-air tank 22 is decompressed to a set pressure by the pressure reducing valve 34 and blown to the working-air circuit 33.

Though one selector valve 36 is shown in FIG. 1, the selector valve 36 is set to each drive unit shown in FIG. 2. Therefore, in the vertically-moving unit 1 for a blow core, working air is alternately supplied to the air chamber divided into upper and lower chambers by the piston of the air cylinder unit 11 and the piston rod 11a performs telescopic motion.

The working-air tank 22 is provided with a valve 38 for controlling the pressure of collected air to 15 kgf/cm$^2$. Moreover, the selector valves 27, 28, 30, and 36 in each air circuit use a solenoid valve respectively.

The above-mentioned air tanks 21 and 22 store high-pressure blow air and low-pressure working air compressed by the compressor 20 respectively. When the selector valve 27 of the blow-air circuit 26 is opened and other selector valves 28 and 30 are closed, high-pressure air is supplied to the blow core 18 form the blow-air tank 21 to fully expand the preform 9 in the cavity of the blow mold 7.

FIG. 1 shows a case in which high-pressure air used for blow-molding is exhausted and the process advances to opening of the blow mold 7. Simultaneously with the mold opening, working air is supplied from the working-air tank 22 to the air cylinder units of the fixing unit 3 for a blow core, the vertically-moving unit 1 for a blow core, the extending unit 2 for a stretching rod, the positioning unit 5 for a transfer board 10 and the releasing unit 4 for a product so as to carry out canceling of the fixed state, raising of the blow core and stretching rod, and lowering of the expanding member in order.

By closing the selector valve 27 to stop the supply of blow air and simultaneously opening the selector valve 30 to connect the air-blow circuit 26 with the working-air tank 22 when blow molding before the exhaust process in FIG. 1 is completed, the high-pressure air opens the check valve 31 by the differential pressure produced between the circuit 26 and the tank 22 and flows into the working-air tank 22 to be collected.

At this point of time, the amount of air stored in the working-air tank 22 is decreased because air is already consumed for operations of the above drive units and the decreased amount of air is replenished by collecting the above used blow air. This collecting is continued until the circuit pressure is lowered due to inflow into the working-air tank 22 and balanced and a saturated state which can hardly be restored only by the circuit pressure is realized. However, the pressure of the working-air tank 22 does not become lower than the set pressure and therefore, a proper pressure is maintained.

When the saturated state is realized, the selector valve 30 is closed to cut off the air circuit 32 and the selector valve 28 of the exhaust circuit 29 is opened as shown in FIG. 1. Thereby, air not collected yet is exhausted into the atmosphere and no used air remains in the blow air circuit 26.

In the case of the working-air tank 22, the tank capacity is frequently limited from the viewpoint of the setting space and the blow air consumption in one molding cycle depends on the number of products simultaneously produced per one molding cycle. However, it is impossible to compensate for the whole working-air consumption by the collected air and the collected air is always only partial replenishment. Therefore, when air consumption is repeated, working air is reduced due to the difference between air consumption and collected air quantity. This reduction is compensated by compressed air supply from the compressor 20.

The compressor 20 operates to supply compressed air to the blow-air tank 21. At the same time, the compressor 20 also supplies air to the working-air tank 22. However, the supply of compressed air to the working-air tank 22 is only continued by the pressure reducing valve 25 until the air pressure reaches a set value. Furthermore, the working air pressure is not reduced to the set value or less every molding cycle. Because pressure reduction is caused by repetition of air consumption, the pressure in the working-air tank 22 is kept at the set value by driving the compressor 20 during the period. Therefore, the working-air tank 22 secures an air pressure and an amount of working air enough to operate each drive unit in order of process.

Moreover, the operating time of the compressor 20 decreases compared to the case of using only a single high-pressure air tank for blow air and working air because the consumed air in the working-air tank 22 is replenished by collected air and therefore, the clearance rate is increased.

[Embodiment]
Type of molding machine SB3-250LL
Molding cycle: 15 sec
Number of products produced/1 cycle 1.5 lit.×4
Compressor 1,700 lit/min ANR 22 KW 25 kgf/cm$^2$
Tank capacity 30 lit each
<1> Working-air consumption (10 kgf/cm$^2$) 544 lit/min ANR
<2> Blow air consumption (22 kgf/cm$^2$) 592 lit/min ANR
<3> Collected blow air (11 kgf/cm$^2$) 290 lit/min ANR
<4> Total air consumption 544+592=1,136 lit/min ANR
<5> Availability factor of compressor (from viewpoint of discharge quantity)

$$\frac{1{,}136 \text{ lit/min ANR}}{1{,}700 \text{ lit/min ANR}} \times 100 = 66.82\%$$

<6> Utilization factor of used blow air $$\frac{(1,136 - 290) \text{ lit/min ANR}}{1,700 \text{ lit/min ANR}} \times 100 = 49.76\%$$

<7> Cost reduction
(1−49.76/66.82)×100=25.53%

What is claimed is:

1. An air working system for drive units of a stretch-blow molding machine, comprising:
   a blow mold for receiving a preform to be expanded therein;
   a blowing unit connected with the blow mold and comprising a blow core for injecting high pressure air into a preform in the blow mold;
   a blow air tank for always storing a predetermined amount of high pressure air, and the blow air tank being connected with the blow core for supplying high pressure air;
   a blow air circuit between the blow core and the blow air tank, a first selective valve in the blow air circuit and operable for selectively opening and closing the communication between the blow air tank and the blow core;
   an exhaust circuit connected with the blow air circuit and a second selective valve in the exhaust circuit and operable to selectively permit exhausting of air from the blow air circuit through the exhaust air circuit and blocking exhaustion of air from the blow air circuit;
   a working unit comprised of air cylinder units of various drive units related to stretch blow molding of a preform;
   a low pressure working air tank, a working air circuit connecting the working air tank with the air cylinder units; a first pressure reducing valve in the working air circuit for reducing the pressure therein, and a third selective valve in the working air circuit and operable for selectively opening and closing the working air circuit;
   an air collecting circuit connected to both of the working air tank and the blow air circuit for collecting used blow air from the blow air circuit and directing the collected blow air to the working air tank as working air; a fourth selective valve in the air collecting circuit for selectively opening and closing the air collecting circuit;
   a compressor and connections therefrom to both the blow air tank and the working air tank for respectively supplying compressed high pressure air from the compressor to the blow air tank while supplying compressed low pressure air from the compressor to the working air tank, and a second pressure reducing valve in the connection from the compressor to the low pressure working air tank.

2. The air working system for various drive units of a stretch-blow molding machine according to claim 1, wherein each of various drive units connected to a low-pressure working-air tank by said working-air circuit is provided with a cylinder unit to be reciprocated by working air with an air pressure lower than blow air and has a selector valve for each air cylinder unit.

3. The air working system for various drive units of stretch-blow molding machine according to claim 1, wherein various drive units related to stretch-blow molding include a vertically-moving unit for a blow core, an extending unit for a stretching rod, and a fixing unit for a blow core each of which is reciprocated by a piston of an air cylinder which is reciprocated by used blow air collected in said working-air tank.

4. The air working system for various drive units of stretch-blow molding machine according to claim 1, wherein various drive units related to stretch-blow molding include a positioning unit for a transfer board and a releasing unit for a product each of which is reciprocated by a piston of an air cylinder which is reciprocated by used blow air collected in said working-air tank.

* * * * *